INVENTOR.
LAURENCE C. BIGGLE
BY
John Flam
ATTORNEY

INVENTOR.
LAURENCE C. BIGGLE
BY John Flam
ATTORNEY

Dec. 18, 1956   L. C. BIGGLE   2,774,564
ELECTROMAGNETICALLY OPERATED CONTROLLER FOR VALVES OR THE LIKE
Filed May 24, 1951   5 Sheets-Sheet 3

INVENTOR.
LAURENCE C. BIGGLE
BY John Flam
ATTORNEY

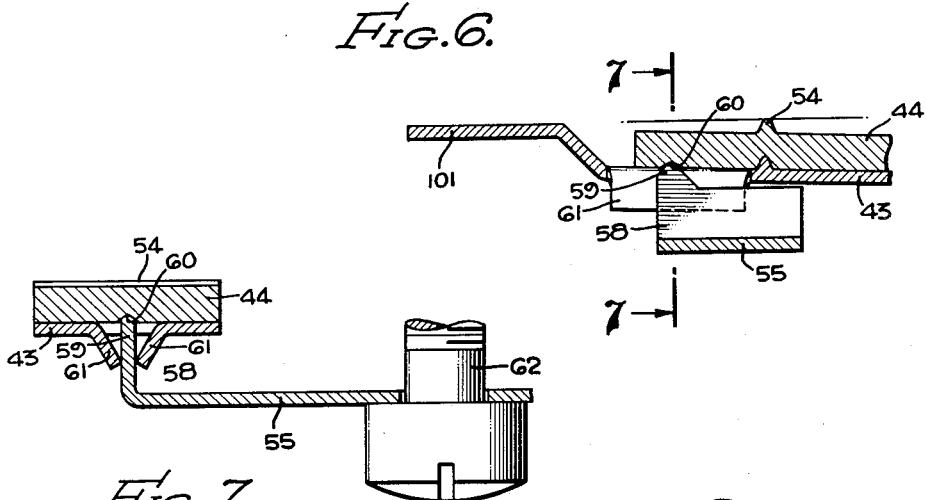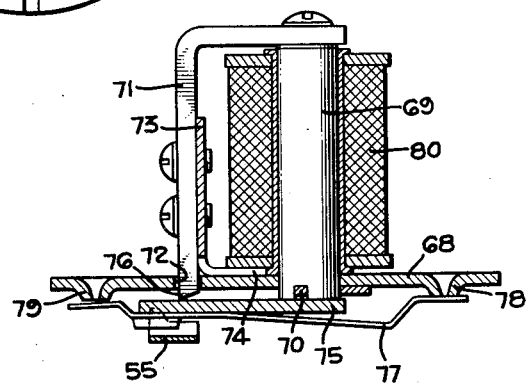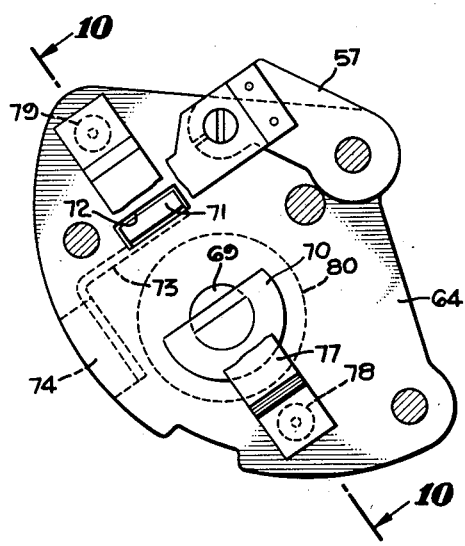

Dec. 18, 1956  L. C. BIGGLE  2,774,564
ELECTROMAGNETICALLY OPERATED CONTROLLER FOR VALVES OR THE LIKE
Filed May 24, 1951  5 Sheets-Sheet 5

INVENTOR.
LAURENCE C. BIGGLE
BY John Flam
ATTORNEY

United States Patent Office 2,774,564
Patented Dec. 18, 1956

2,774,564

ELECTROMAGNETICALLY OPERATED CONTROLLER FOR VALVES OR THE LIKE

Laurence C. Biggle, Altadena, Calif., assignor to General Controls Co., Glendale, Calif., a corporation of California Application May 24, 1951, Serial No. 228,071

11 Claims. (Cl. 251—30)

This invention relates to an electromagnetic control, such as for valves.

In Patent No. 2,292,477, issued August 11, 1942, to William A. Ray, there is described a valve for controlling the flow of gaseous fuel to a burner. More specifically, the valve therein is shown as having a closure mounted on a movable diaphragm that defines a pressure chamber. The armature of an electromagnet is used to control the pressure in the chamber for moving the closure. This is accomplished by the aid of jets in the chamber so arranged that one of them, when open, serves to exhaust the chamber to permit the closure to move to the open position. When this jet is closed, and another jet opened, the inlet pressure is effective to move the diaphragm and the closure to closed position.

In such an arrangement, it is difficult to maintain or construct the jet structures and the armature that alternatively closes the jets, in proper sealing relation. Even a slight angular deviation between the face of the jet and the contacting face of the armature is sufficient to provide intolerable leaks.

Furthermore, when it is desired to repair or replace the jets or the electromagnet, an extensive dismantling is necessary.

It is one of the objects of this invention generally to improve such jet controlled devices.

It is another object of this invention to provide a jet control structure that can be maintained in proper operating condition, and that may be simply and readily constructed to effect this result.

It is still another object of this invention to provide a jet structure, and control electromagnet therefor, that can be readily dismantled for inspection, replacement, or repair.

In order to accomplish these results, a special form of electromagnetic armature structure is employed. This type of structure is readily applicable to purposes other than for the control of jets; i. e., for operating relay contacts. Accordingly, it is another object of this invention to provide a simple and improved mounting for an electromagnet armature.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 6 is an enlarged fragmentary view, partly in section, of a portion of the apparatus;

Fig. 7 is an enlarged fragmentary sectional view, taken along a plane corresponding to line 7—7 of Fig. 6;

Fig. 9 is a fragmentary bottom plan view of a modified form of the invention;

Fig. 10 is a sectional view, taken along a plane corresponding to line 10—10 of Fig. 9.

Figure 1:
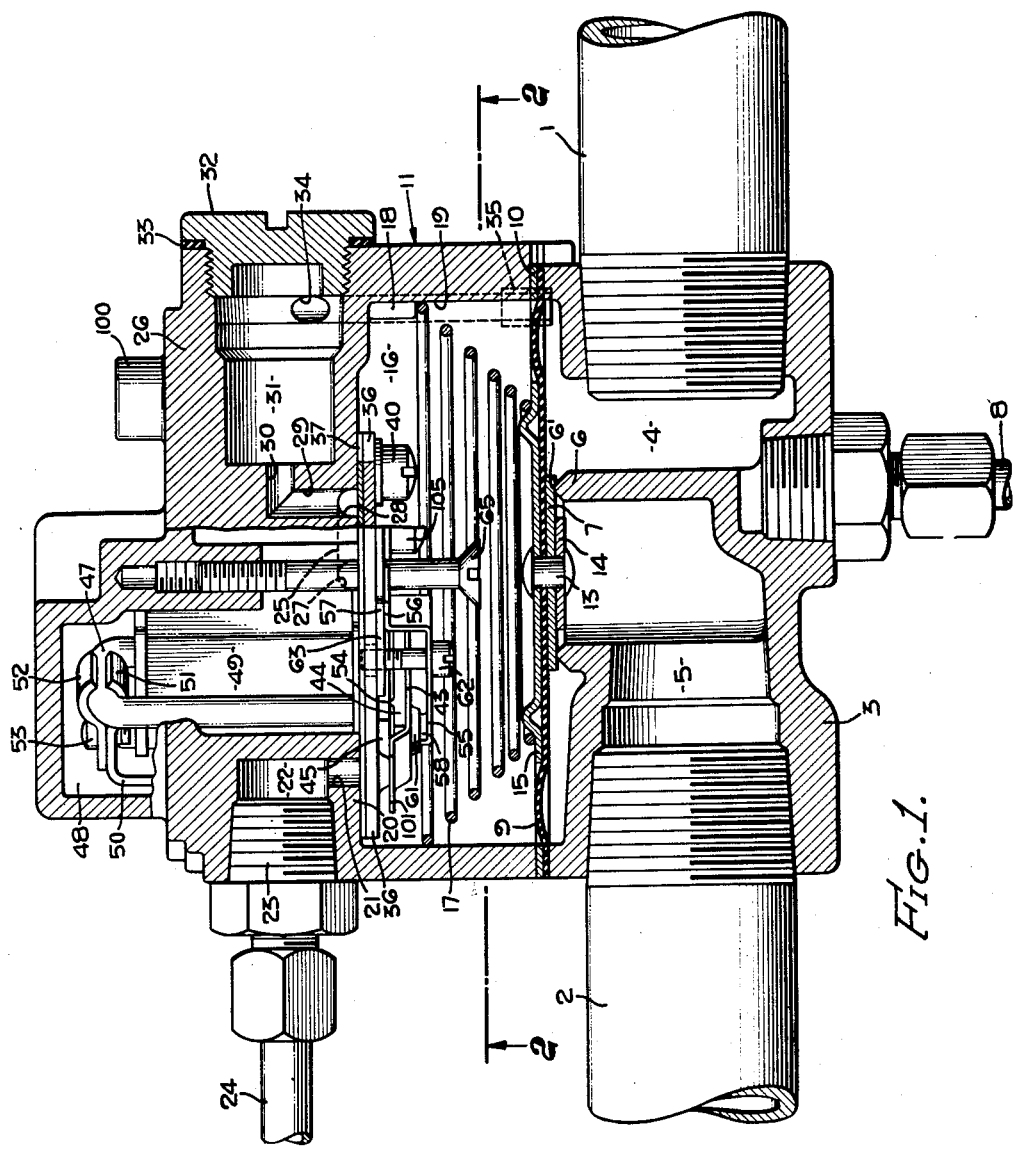
Figure 1 is a sectional view of a valve structure incorporating the invention, the main valve being in closed position.

In Figs. 1 to 8, the invention is adapted to control the flow of a fluid, such as fuel gas, from inlet conduit 1 to an outlet conduit 2 (Fig. 1). These conduits are threaded into appropriate internally threaded openings in a valve body 3. The inlet conduit communicates with an inlet chamber 4; and the outlet conduit is in communication with the outlet port 5.

Body 3 is open at the top. It is sealed, as hereinafter described, by a diaphragm 9.

Inlet chamber 4 is separated from the outlet port 5 by an annular wall 6. The upper edge 6' of the wall forms a tapered seat adapted to cooperate with a closure washer 7 that may be made of yielding material.

In the position shown, flow of fuel from the inlet chamber 4 to the outlet port 5 is interrupted, since the closure member 7 is shown as seated upon the valve seat 6'. The manner in which this closure member may be moved upwardly will be described hereinafter.

The valve structure is especially adapted for the control of the passage of fuel to a main burner. A pilot burner may be supplied with fuel through a conduit 8 which is in communication with the inlet chamber 4.

The closure member 7 is attached to flexible diphraghm 9. This diaphragm serves to define one wall of the inlet chamber 4. This diaphragm is clamped at its edges by the aid of a clamping ring 10 and an upper casing 11. This upper casing 11, as shown most clearly in Figs. 2 and 5, is of general rectangular configuration, and is provided with fastening screws 12 that engage threaded apertures in the upper edge of valve body 3.

The closure member 7 is attached to the diaphragm 9 by the aid of a rivet 13 which extends, as well, through a metal washer 14 and an upper metal plate 15. This metal plate 15 ensures that the center portion of diaphragm 9 will rise and fall in a direction normal to the plane of the valve seat 6'.

The casing 11 defines a pressure chamber 16 of general cylindrical form above the diaphragm 9. The valve closure 7 is held against its seat by gas pressure operating in chamber 16. The lower side of the diaphragm 9 is subjected to the inlet pressure in chamber 4; but, as soon as the closure 7 is seated, there is a greater area on the upper side of the diaphragm 9 upon which gas pressure is exerted than on the lower side. This is true because the closure 7 closes off the area defined by the seat 6'. Furthermore, compression spring 17 serves also to urge the diaphragm 9 to the valve-closing position shown in Fig. 1.

Figure 2:
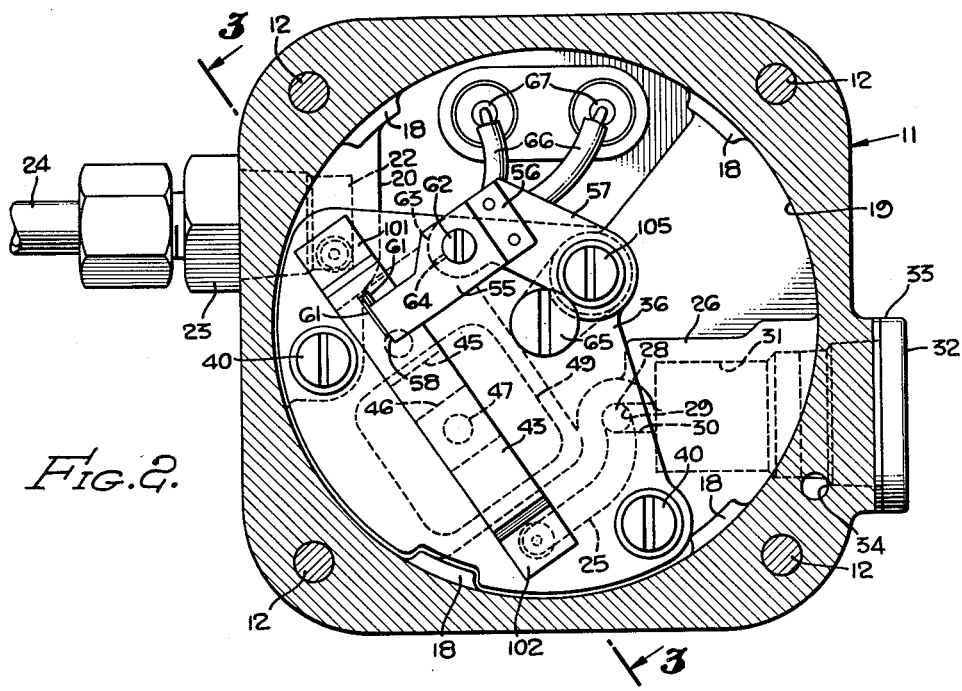
Fig. 2 is a sectional view, taken along a plane corresponding to line 2—2 of Fig. 1.
Figure 5:
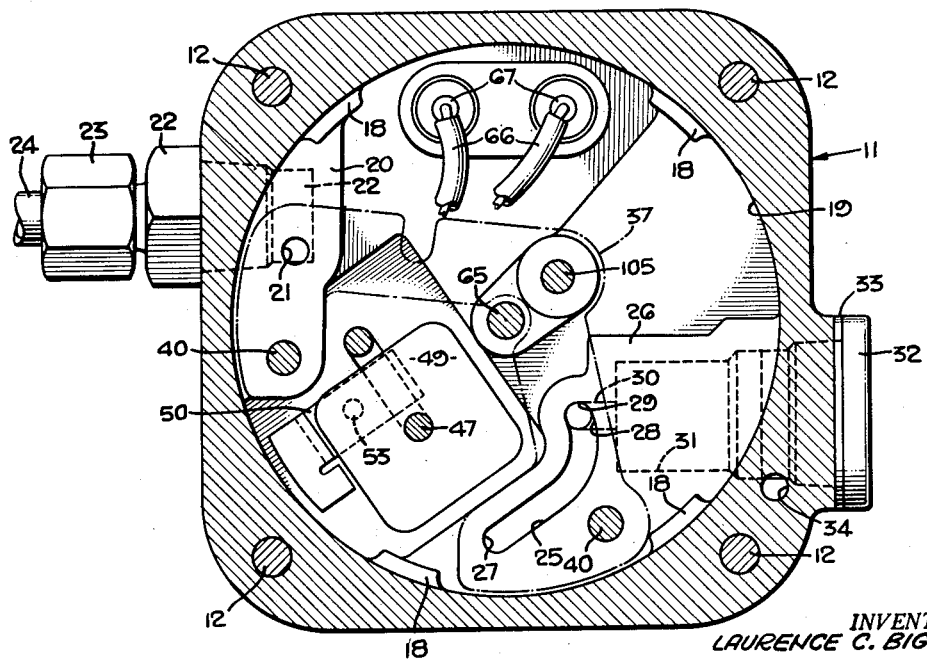
Fig. 5 is a sectional view, taken along a plane corresponding to line 5—5 of Fig. 3.

This spring 17 is of conical configuration, its upper turn having a maximum diameter and engaging underneath a plurality of stops 18 (see, also, Figs. 2 and 5). These stops 18 project inwardly from the cylindrical interior wall 19 of the casing 11.

When the chamber 16 is exposed to atmosphere, the inlet pressure acting in chamber 4 under diaphragm 9 is sufficient to raise the diaphragm against the pressure of spring 17, and the valve is opened. However, if inlet pressure is allowed to enter the chamber 16, the valve closes to the position of Fig. 1.

This mode of operation is fully described in connection with the above-identified Patent No. 2,292,477.

Figure 3:
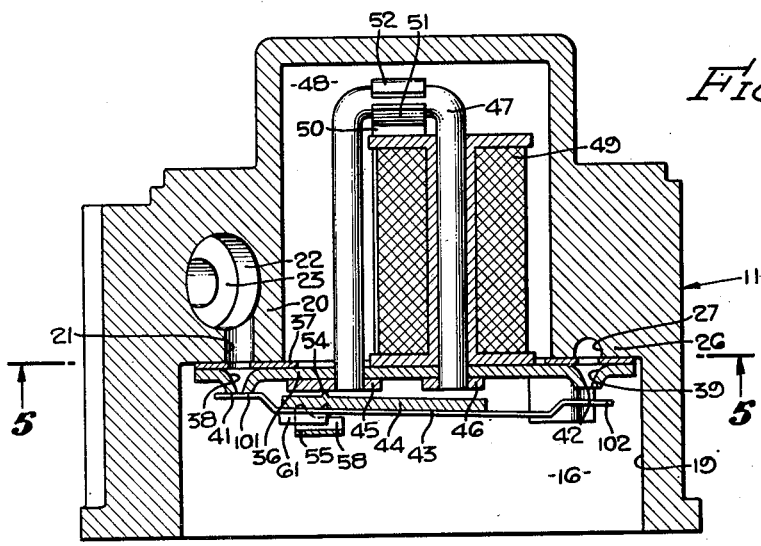
Fig. 3 is a sectional view, taken along a plane corresponding to line 3—3 of Fig. 2.
Figure 4:
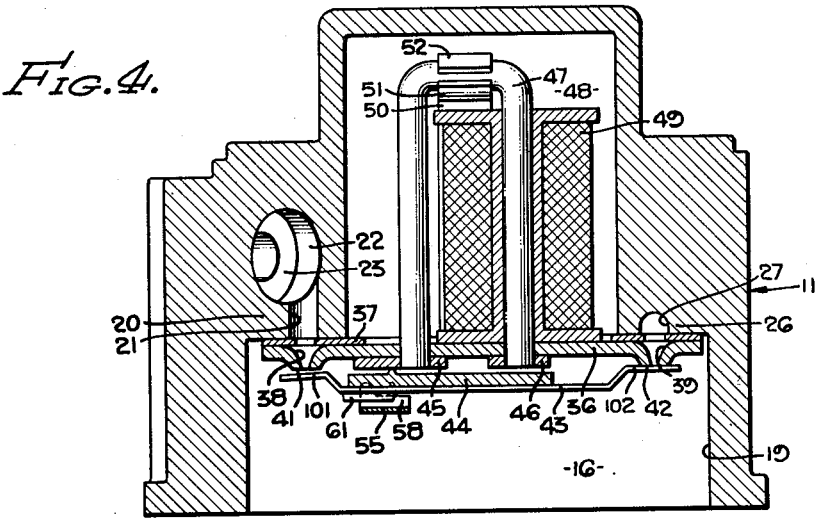
Fig. 4 is a view similar to Fig. 3, but illustrating a position of the apparatus in which the main valve is opened.

The control of pressure in chamber 16 is effected by the aid of a jet structure shown most clearly in Figs. 3 and 4. The chamber 16 of casing 11 has an extension 48, there being bosses 20 and 26 defining the edges of extension 48. In boss 20, as viewed in Fig. 1, there is a vertical port 21 opening into this wall (see, also, Figs. 4 and 5). This port 21 intersects an opening 22 extending horizontally of the casing, and into which is threaded a coupling structure 23. The conduit 24, connected to the coupling structure 23, leads to the atmosphere. Accordingly, when the port 21 is open to the chamber 16, this chamber 16 is exhausted and the diaphragm 9 moves upwardly to open the main valve.

In boss 26, as shown in Fig. 1, there is a groove port 25 (see, also, Fig. 5). One end 27 of the groove 25 is the inlet end; the other end 28 is in communication with a vertical port 29 having a horizontal extension 30 leading to a recess 31 formed in the boss 26. This recess 31 has a threaded portion which may be closed by a cap 32. Interposed between the cap 32 and the casing 11 is a packing member 33. A vertically projecting boss 100 (Fig. 1) may be alternatively used to provide a passage to recess 31. This may be useful for operating the valve by fluid pressure from a source other than the inlet chamber 4.

The groove port 25 in the present instance, however, is in continuous communication with the inlet chamber 4. This is effected by the aid of a port or passageway 34 that extends downwardly through the wall of the casing 11 and opens in chamber 31. As shown most clearly in Fig. 1, this port 34 extends through a bushing 35 set into an opening in the upper flange of the body 3.

Accordingly, when port 27 is open, it serves to pass gaseous fuel under pressure into the chamber 16 through the port 34, recess 31, and ports 30 and 25.

The arrangement is such that alternatively one or the other of the ports 21 or 27 is opened while the other is closed, so as to effect opening and closing of the valve.

In order to control these ports, use is made of a flat supporting member or plate 36. Interposed between this plate 36 and the lower surfaces of bosses 20 and 26 of the casing 11 is a packing or gasket 37. This sealing gasket is shown in phantom lines in Fig. 5.

The plate 36 is provided with a pair of jet openings 38 and 39 (Figs. 3 and 4) formed by an appropriate upsetting operation of the plate 36. Conical-like projections defining these openings are thus provided. These jet openings 38 and 39 are respectively aligned with ports 21 and 27, as well as with corresponding apertures in the gasket 37. A plurality of screws 40, shown most clearly in Fig. 2, pass through the plate 36 and the gasket 37 for engagement with appropriate threaded apertures in the bosses 20 and 26 of the casing 11.

The edges 41 and 42, defining the jet openings, are formed by a common horizontal plane. Accordingly, a simple machining of these edges is effected.

Cooperating with these edges 41 and 42 is a closure member 43 formed of a thin strip of metal, and having end portions 101 and 102 adapted alternatively to overlie and contact the edge surfaces 41 and 42. This closure member is shown to best advantage in Figs. 3, 4, and 8. These ends are at a slight angle to each other. Member 43 is mounted, as by welding, upon an armature 44 as by the aid of projection welding adjacent the left-hand end of the closure member 43, as viewed in Figs. 3 and 4.

This armature 44 is tiltably mounted. It is adapted to be attracted by the pole pieces 45 and 46 welded to the lower surface of the supporting plate 36. These pole pieces are joined, respectively, to the ends of the U-shaped core member 47 which extends upwardly into the extension 48. An electromagnet coil 49 extends around one of the legs of the core 47. The core 47 is supported by the aid of a bracket 50 (see, also, Fig. 5) extending upwardly from the plate 36, and fastened thereto as by welding. This bracket carries the lower portion 51 of a clamp. The upper portion 52 of the clamp is held in clamping position around the central portion of the core member 47 as by the aid of the screw 53 (Fig. 1).

The armature 44, in the unattracted position of Fig. 3, serves to close the jet 38 and to open the jet 39. In this position, the inlet pressure is effective in chamber 16 to maintain the main valve closure 7 in closed position.

The armature 44 is provided with a coined projection 54, shown most clearly in Fig. 6. This projection extends transversely of the armature, as shown most clearly in Fig. 7, and contacts the extended portion of the pole piece 45. The armature tilts about the fulcrum formed by this transverse projection. The armature is confined to angular motion by the aid of a spring member 55 which is of flat form. This spring member 55 is attached, as by its flange 56, to the bracket 57 (Figs. 1 and 2) that is attached, by the aid of a screw 105, to the supporting plate 36.

Figure 8:
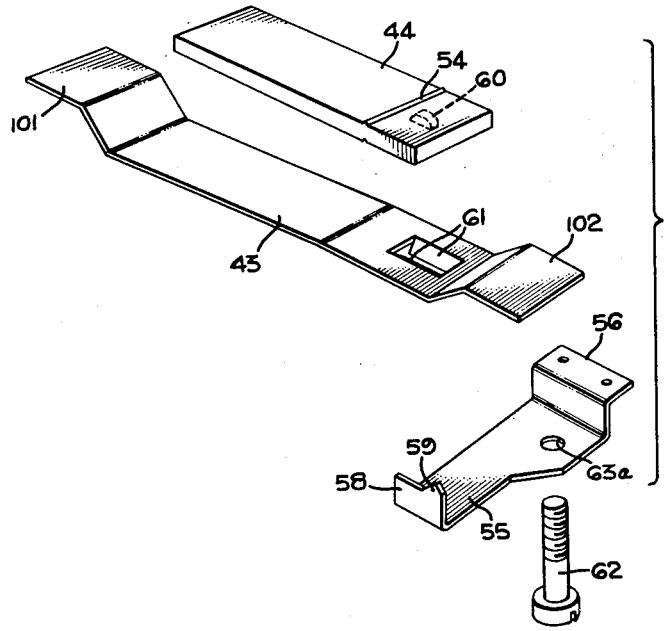
Fig. 8 is an enlarged exploded view of a part of the apparatus illustrated in Figs. 6 and 7.

The spring 55 has an upwardly directed end 58 provided with a projection 59. This projection 59, as shown most clearly in Figs. 6, 7, and 8, is engaged in a recess or groove 60 in the lower side of the armature 44. The closure member 43 is provided with a guiding aperture formed by the sloping, downwardly struck portions 61 of the member 43. These portions 61 converge upwardly to define a narrow slit for guiding the spring end 58. It also serves to prevent any lateral movement of the armature 44 with respect to the pole pieces 45 and 46, since member 43 is attached to the armature.

In order to adjust the force of the spring member 55, a screw 62 is provided passing through an aperture 63a in the spring member 55, and threaded into an appropriate threaded aperture in the ear 63 of the bracket 57.

This ear 63, as shown most clearly in Fig. 2, is provided with a slot 64 in order to make it possible to provide a frictional restraint against turning of the screw 62.

When it is desired to disassemble the armature structure, it is a simple matter to release the screw 62 and to move the armature structure away from the supporting plate 36 for replacement or repair.

The opposite ends 101, 102 of the closure member 43 are flat, and, as heretofore stated, at a slight angle with respect to each other, so that they can alternatively accurately contact the flat surfaces 41 and 42 of the jets 38 and 39. Thus, in the unenergized position of Fig. 3, the left-hand jet member 38 is closed and the right-hand jet member 39 is open. However, when the electromagnet coil 49 is energized, the parts assume the position shown in Fig. 4. In this position, the jet 39 is closed and the jet 38 is open. This causes the chamber 16 to be exhausted and the valve closure member 7 opened by fluid pressure exerted below diaphragm 9.

It is noted that, in the attracted position of Fig. 4, the armature 44 does not contact the polar areas of the pole pieces 45 and 46. Accordingly, as soon as the electromagnet coil 49 is deenergized, the armature 44 drops to the position of Fig. 3, causing the valve to close. There is, therefore, a prompt drop-out. In order to limit the upward movement of the diaphragm 9, use is made of an adjustable screw 65. This screw 65 is threaded into an appropriate threaded aperture in the upper wall of casing 11, and it serves as a stop for the upper head of rivet 13.

Since the entire jet structure and its operating mechanism are supported upon the plate support 36, it is a simple matter to remove and replace any of the parts. This is accomplished by removing the casing 11 from the valve body 3 and then removing the screws 40. The armature structure, as hereinabove described, can be readily removed, inspected, repaired, and replaced, as required.

The leads 66 for the coil 49 are shown in Fig. 2. They may extend upwardly through appropriate insulated binding post structure 67 for connection to any appropriate source.

If this source is a thermocouple or thermopile affected by the pilot flame of a pilot burner when the flame is in existence, the electromagnet coil 49 is energized when the flame is in existence, and assumes the position of Fig. 4. The valve is then permitted to open, since the diaphragm 9 moves upwardly to move the closure member 7 (Fig. 1) away from the valve seat. When the pilot flame fails, the armature 44 drops out to the position of Fig. 3 and the valve closes by the imposition of gas pressure above the diaphragm 9.

In the form shown in Figs. 9 and 10, the jet supporting member 68 is formed substantially as before. In this form, an A. C. electromagnet is utilized, having a central cylindrical core 69 provided with a shading coil 70. The magnetic structure also includes a magnetic leg 71, extending through an aperture 72 in the support 64. This member 71 is attached to a bracket 73 having a base 74 welded to the upper surface of the plate 68.

The armature 75, in this instance, is tiltable about the knife-edge 76 formed at the lower end of the magnetic member 71. Furthermore, the closure member 77 is projection welded at its left-hand end to the lower surface of the armature surface 75. The armature 75 is urged to unattracted position by the aid of the spring 55 in the same manner as described in the form shown in Figs. 1 to 8, inclusive.

In the attracted position of Fig. 10, the armature 75 is in contact with the lower face of the cylindrical core member 69. In this position, the closure member 77 is slightly flexed in order to provide a strong closure for the jet 78. The other jet 79, in the attracted position, is open. When the electromagnetic coil 80 is deenergized, the armature 75 drops out to energize the jet 78 and close the jet 79.

By the aid of this structure, the control of the valve may be accomplished from a source of alternative current independently of the pilot flame.

Figure 11:
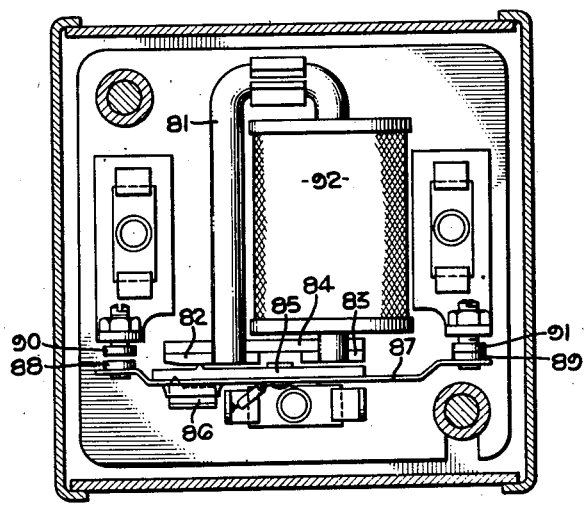
Fig. 11 is a view, mainly in elevation, of another embodiment of the invention.

The armature structure, and the spring structure for urging it to unattracted position, may be utilized for the operation of relay contacts. This form is illustrated in Fig. 11. The core 81 is constructed substantially as in the form first described, and is provided with the pole pieces 82 and 83 attached to supporting plate 84. The armature 85, as before, is urged in a clockwise direction about the pole piece 82 by the aid of the spring structure 86. The member 87, which is welded to the lower side of the armature 85, carries the movable contact members 88 and 89 adapted to cooperate with the contact members 90 and 91. In the attracted position, as shown in Fig. 11, the contact members 89 and 91 are in engagement, and the contact members 88 and 90 are out of engagement. This corresponds to the energized condition of the electromagnet coil 92. When the coil 92 is deenergized, the spring 86 urges the armature 85 in a clockwise direction to open the contacts 89 and 91 and to close contacts 88 and 90.

The inventor claims:

1. In a valve structure: a support having a pair of spaced ports; a member having jet openings corresponding to the ports and detachably secured to the support; said jet openings extending in spaced relationship; said jet openings having edges that are defined by plane surfaces; and a tiltable structure mounted on the member and at a point intermediate the jet openings, and having a valve closure with plane surfaces cooperating with said edges for alternately exposing one jet opening and closing the other opening in accordance with the anugular position of the tiltable structure.

2. In a valve structure: a support having a pair of spaced ports; a member having jet openings corresponding to the ports and detachably secured to the support; said jet openings extending in spaced relationship; said jet openings having edges that are defined by plane surfaces; an electromagnet supported on said member, and having a core with a polar area facing in the same direction as the jet openings; an armature tiltably supported with respect to the said polar area and at a point intermediate the jet openings; and a valve closure carried by the armature and having plane surfaces cooperating with said edges for alternately exposing one jet opening and closing the other opening in accordance with the angular position of the tiltable armature.

3. In a valve structure: a support having a pair of spaced ports; a member having jet openings corresponding to the ports and attached to the support; said jet openings extending in spaced parallel relationship; said jet openings having edges that are defined by a common plane surface; an electromagnet having a core with polar projections exposed on the same side of the member as the jet openings; said core being supported on the member; an armature tiltable on one of said projections and at a point intermediate the jet openings; a valve closure mounted on the armature and having opposite ends with plane surfaces cooperating with said edges for alternately exposing one jet opening and closing the other opening in accordance with the angular position of the tiltable armature; a leaf spring member detachably mounting the armature and having a free end engaging the armature to urge it to unattracted position; and means urging the spring member against said armature.

4. In a valve structure: a support having a pair of spaced ports; a member having jet openings corresponding to the ports and attached to the support; said jet openings extending in spaced parallel relationship; said jet openings having edges that are defined by a common plane surface; an electromagnet having a core with polar projections exposed on the same side of the member as the jet openings; said core being supported on the member; an armature tiltable on one of said projections and at a point intermediate the jet openings; a valve closure mounted on the armature and having opposite ends with plane surfaces cooperating with said edges for alternately exposing one jet opening and closing the other opening in accordance with the angular position of the tiltable armature; a leaf spring member detachably mounting the armature and having a free end engaging the armature to urge it to unattracted position; and a screw passing through the spring member for urging said spring member against the armature.

5. In a valve structure: a support having a pair of spaced ports; a member having jet openings corresponding to the ports and attached to the support; said jet openings extending in spaced parallel relationship; said jet openings having edges that are defined by a common plane surface; an electromagnet having a core with polar projections exposed on the same side of the member as the jet openings; said core being supported on the member; an armature tiltable on one of said projections and at a point intermediate the jet openings; a valve closure mounted on the armature and having opposite ends with plane surfaces cooperating with said edges for alternately exposing one jet opening and closing the other opening in accordance with the angular position of the tiltable armature; and a leaf spring member detachably mounting the armature and having a free end engaging the armature to urge it toward unattracted position, said end of the spring member passing through a guide opening in the valve closure to confine movement of the armature substantially to an angular movement; and means for attaching the spring member to the member that provides the jet openings.

6. In a valve structure: a support having a pair of spaced ports; a member having jet openings corresponding to the ports and attached to the support; said jet openings extending in spaced parallel relationship; said jet openings having edges that are defined by a common plane surface; an electromagnet having a core with polar projections exposed on the same side of the member as the jet openings; said core being supported on the member; an armature tiltable on one of said projections and at a point intermediate the jet openings; a valve closure mounted on the armature and having opposite ends with plane surfaces cooperating with said edges for alternately exposing one jet opening and closing the other opening in accordance with the angular position of the tiltable armature; and a leaf spring member detachably mounting the armature and having a free end engaging the armature to urge it toward unattracted position, said end of the spring member passing through a guide opening in the valve closure to confine movement of the armature substantially to an angular movement; means for attaching the spring member to the member that provides the jet openings; and a screw passing through the spring member for urging said spring member against the armature.

7. In a valve structure: a support having a pair of spaced ports; a member having jet openings corresponding to the ports and attached to the support; said jet openings extending in spaced parallel relationship; said jet openings having edges that are defined by a common plane surface; an electromagnet having a core with polar projections exposed on the same side of the member as the jet openings; said core being supported on the member; an armature tiltable on one of said projections and at a point intermediate the jet openings; a valve closure mounted on the armature and having opposite ends with plane surfaces cooperating with said edges for alternately exposing one jet opening and closing the other opening in accordance with the angular position of the tiltable armature; a leaf spring member having a free end engaging a recess in the armature to urge it to unattracted position; and a screw passing through the spring member for urging said spring member against the armature.

8. In an electromagnet structure: a supporting member; a core having polar projections exposed on one side of the member and having legs projecting from the other side of the member; a coil on the core; an armature tiltable on one of the projections; a control member mounted on the armature; and a leaf spring member mounted on said supporting member and having a non-circular end projecting through and fitting a non-circular aperture in the control member and also engaging a recess in the armature for urging the armature to unattracted position.

9. In a controlling apparatus for a valve: a casing having a pair of ports; a support detachably secured to said casing, and having means forming jet openings in alignment with the ports respectively; an electromagnet carried by the support; said electromagnet having a polar projection on one side of said support; an armature member having means cooperable with said jet openings to control said openings; means forming an edge tiltably mounting said armature member on said polar projection and at a point intermediate the jet openings; and means releasably holding said armature in engagement with said polar projection, comprising a leaf spring engaging a guiding recess in said armature member, said leaf spring also urging said armature member in one angular direction about said tiltable mounting.

10. In an electromagnet structure: a support; an electromagnet mounted on the support and having a polar area exposed on one side of said support; an armature member cooperable with said electromagnet, said armature member having on one side thereof a projection engagable with said area to provide a tiltable mounting for said armature member; said armature member also having on the other side thereof a non-circular guiding recess spaced from said projection; and a leaf spring carried by said support and accommodated in and fitting said guiding recess, said leaf spring confining said armature member for angular movement about an axis at said projection, and biasing said armature member toward one angular position; said armature being otherwise unattached to said structure; said armature member being removable upon movement of said leaf spring out of engagement with said guiding recess.

11. In combination: an electromagnet having a pole member; an armature member; means providing a pivot between the members formed between engaging surfaces thereof; a leaf spring; said armature having another surface interfitting a movable portion of said leaf spring at a place remote from said pivot forming means; the engaging leaf spring and said other armature surface confining movement of said armature member to pivotal movement; said armature member being otherwise unattached to permit removal of said armature member upon flexure of said leaf spring to move said leaf spring from engagement with said other armature surface.

References Cited in the file of this patent

UNITED STATES PATENTS

| 300,068 | Gravier | June 10, 1884 |
| 368,674 | Kent | Aug. 23, 1887 |
| 1,177,718 | Mertin | Apr. 4, 1916 |
| 2,274,917 | Carlson | Mar. 3, 1942 |
| 2,292,477 | Ray | Aug. 11, 1942 |
| 2,381,080 | Ray | Aug 7, 1945 |
| 2,391,692 | Estes | Dec. 25, 1945 |
| 2,519,093 | Zoerlein | Aug. 15, 1950 |
| 2,526,685 | Price | Oct. 24, 1950 |
| 2,562,631 | Morrison | July 31, 1951 |
| 2,570,450 | Hottenroth | Oct. 9, 1951 |

FOREIGN PATENTS

| 40,551 | Denmark | July 29, 1929 |
| 350,487 | Great Britain | June 12, 1931 |